United States Patent
Bick et al.

(10) Patent No.: US 6,634,615 B1
(45) Date of Patent: Oct. 21, 2003

(54) SYSTEM, KIT AND METHOD FOR SEISMIC RESTRAINT OF LARGE ELECTRICAL EQUIPMENT

(76) Inventors: Randy Bick, 856 Cypress Dr., Upland, CA (US) 91784-1191; Frank Dunn, 28344 Pueblo Dr., Trabuco Canyon, CA (US) 92679-1148; Ryson Kuga, 6741 Bridgewater Dr., Huntington Beach, CA (US) 92647

( * ) Notice: Subject to any disclaimer, the term of this patent is extended or adjusted under 35 U.S.C. 154(b) by 0 days.

(21) Appl. No.: 09/625,744

(22) Filed: Jul. 26, 2000

(51) Int. Cl.$^7$ .............................................. B65D 63/00
(52) U.S. Cl. .................... 248/499; 248/500; 52/223.13; 52/698
(58) Field of Search ................................ 248/501, 506, 248/500, 510, 680, 681, 499; 52/648, 23, 149, 166, DIG. 11, 223.13, 231, 291

(56) References Cited

U.S. PATENT DOCUMENTS

| | | | |
|---|---|---|---|
| 142,619 A | 9/1873 | Eastman et al. ............. 248/500 |
| 3,606,231 A | * 9/1971 | Kilborn .................... 248/354.1 |
| 3,606,704 A | 9/1971 | Denton ....................... 52/167.8 |
| 3,830,457 A | * 8/1974 | Stewart ....................... 248/361 |
| 3,972,170 A | 8/1976 | Brammer ...................... 52/750 |
| 4,065,218 A | 12/1977 | Biggane ..................... 52/167.1 |
| 4,130,067 A | 12/1978 | Kilgus .................... 105/368 R |
| 4,272,933 A | * 6/1981 | Lopes .......................... 52/149 |
| 4,611,961 A | 9/1986 | Van Iperen et al. ........... 410/20 |
| H256 H | 4/1987 | Annibale et al. ............ 248/499 |
| 4,700,923 A | 10/1987 | Lewis, Jr. et al. ........... 248/679 |
| 4,763,869 A | 8/1988 | Nakamura et al. ........... 248/562 |
| 5,330,147 A | 7/1994 | Volcheff et al. .......... 248/316.4 |
| 5,330,148 A | 7/1994 | Floyd ......................... 248/499 |
| 5,456,443 A | 10/1995 | Taaffe ........................ 248/499 |
| 5,535,561 A | * 7/1996 | Schuyler ................... 52/223.13 |
| 5,687,512 A | * 11/1997 | Spoozak et al. ............... 52/23 |
| 5,690,311 A | 11/1997 | Leighton et al. ............ 248/681 |
| 5,692,402 A | 12/1997 | Clements ...................... 70/234 |
| 5,875,601 A | * 3/1999 | Gutelius, Jr. et al. ......... 52/698 |
| 6,000,670 A | 12/1999 | Okamoto ..................... 248/562 |
| 6,076,326 A | * 6/2000 | Gutelius, Jr. et al. ......... 52/698 |
| 6,094,800 A | * 8/2000 | Gutelius, Jr. et al. ......... 52/698 |

OTHER PUBLICATIONS

W.W. Patterson Home Page, http://www.turnbuckles.com, Apr. 8, 2000, 2 pages.
Keystone Manufacturing and Supply, http://www.kmsinc.net, Apr. 8, 2000, 2 pages.
Meyer, John D. et al., *Retrofit Seismic Mitigation of Mainframe Computers and Associated Equipment: A Case Study*, Seminar Technical Papers, pp. 149–163.

* cited by examiner

*Primary Examiner*—Leslie A. Braun
*Assistant Examiner*—Gwendolyn Baxter

(57) ABSTRACT

A seismic restraint system, kit and method for restraining electrical equipment weighing up to 2000 pounds, or greater, in an earthquake. The kit allows for facile installation of the seismic restraint system at any site. Importantly, the system allows the electrical equipment to be reconfigured without redrilling of a concrete sub-floor which is used as an anchor point for the restraint system attached to the electrical equipment. The restraint system is particularly suitable for restraining large computer units in a seismic event.

20 Claims, 10 Drawing Sheets

SYSTEM, KIT AND METHOD FOR SEISMIC RESTRAINT OF LARGE ELECTRICAL EQUIPMENT

BACKGROUND

In areas of moderate to high seismicity, the Uniform Building Code requires large computer units, weighing more than 400 pounds, to be stably restrained so as to prevent these computer units from becoming moving hazards in an earthquake. Moreover, where continuous operation of the computer units is necessary, it is imperative that the units be stably anchored so as to prevent damage to the units themselves in a seismic event.

Until recently, most computers were secured by relatively unsound methods. In the past, computer units were restrained by the electrical cables that feed power into the units, or by bent bars placed around the caster wheels to serve as caster stops. These methods were capable of restraining the units, but did not protect the computer units from damage. Some of these prior seismic restraint methods, however, actually failed to restrain the computer units at all, leading to the hazardous conditions mentioned above.

It is evident that proper seismic restraint for computer units could provide assurances against damage to life and property. Thus, a direct, positive, and calibrated structural anchoring system for large computer units is needed.

A currently utilized seismic restraint system is described in a recent technical publication. See John D. Meyer, S. E., Dr. Tsu T. Soong, Richard H. Hill, "Retrofit Seismic Mitigation of Mainframe Computers and Associated Equipment: A Case Study", ATC 29-1, 1998, pp. 149–163. This seismic restraint system uses steel cables, turnbuckles, eyebolts and direct, drop-in, concrete anchors. Indeed, this seismic restraint system meets the criteria set for by the Uniform Building Code. This restraint system, however, does not satisfy some of the needs encountered during certain on-site conditions due to the inaccessibility of its connecting subsystem and the rigidity of its fixed anchoring subsystem.

For example, using this prior art seismic restraint system, it is difficult to install the steel cable onto the computer unit because this restraint system requires that the cable be looped through the caster frame. If the space gap between the caster wheel and the caster frame is relatively narrow, it becomes difficult, to nearly impossible, to loop the cable through the caster frame and the wheel. Moreover, due to obstructions in and around the computer units, accessibility to the caster frame system also may be limited.

Further, there is frequently a need to reconfigure the computer units as on site conditions change due to unit model upgrades or to system modifications. However, using the system described in ATC 29-1, computer unit reconfigurations are difficult, or nearly impossible, at the point where the cables are anchored to the concrete slab. This inability to reconfigure the computer units stems from the use of a fixed anchor point in the prior art restraint system. Thus, each time a new computer configuration is desired, new concrete anchors are required to be installed at the reconfigured cable attachment location. Furthermore, in reconfiguring new anchors, new drilling of the concrete slab is required which generates dust that may contaminate the computer units and lead to equipment failure. For facilities where continuous operation is imperative, new drilling for reconfigurations could result in down time of the reconfigured computer units. This down time is generally unacceptable to the end-users. Finally, due to congestion or other conditions at the installation site, utilization of this fixed anchor restraint system may not be possible.

Thus, there(is a need for a seismic restraint tethering system, that would make the attachment of a steel cable to a caster easier and faster. Moreover, there is a need for a seismic restraint system that is capable of being utilized in almost any on-site condition. Above all, there is a need for a new seismic restraint system which is able to accommodate computer unit reconfigurations without re-drilling of the anchoring system.

SUMMARY

The present invention is directed towards a seismic-resistant system for large electrical equipment, weighing 400 pounds or more, and located within or on top of buildings. Such large electrical equipment contains electrical components that can be subject to seismic damage. Moreover, the size of the equipment demands that the equipment be restrained so as to prevent moving hazards in a seismic event. Thus, the present invention restrains such equipment preventing damage to life and property in a seismic event.

The large electrical equipment units to be restrained by the seismic restraint system of the present invention includes large, mainframe computer units. When these computer units are housed in:a building, the units are generally located on a floor system, comprising floor tiles, and the floor system is located above a sub-floor, generally comprising concrete. The sub-floor is used as the anchoring point of the seismic restraint system to the electrical equipment.

The seismic restraint system of the present invention further comprises at least two tracks affixed to the sub-floor with fasteners and at least three tie downs. Each tie down of the seismic restraint system comprises: 1) a tethering anchor secured to the track; 2) a connector connected directly to a respective one of the support assemblies; and 3) a flexible wire extending between the tethering anchor and the connector.

Overall, the seismic restraint system of the present invention comprises three subsystems, namely a connector subsystem, a tether subsystem, which together form the tie down of the seismic restraint system, and an anchor subsystem. These subsystems serve to connect, tether and anchor the electrical equipment to the sub-floor.

The major components of the connector subsystem are an axle and an angle bracket for attachment to the bottom housing of computer units via multiple support assemblies. These support assemblies are preferably in the form of casters, comprising a wheel and a caster frame, and are located on the bottom of the computer housing. The caster wheel is usually connected to the caster frame by an axle. This exiting axle, or another axle used in its place, provide a first point of attachment for the seismic restraint system.

The major components of the tether subsystem are a flexible wire, a tension adjuster and a tethering anchor for adjusting the tension on the wire. The tether subsystem provides points of attachment to both the connector subsystem and the anchor subsystem.

The major components of the anchor subsystem are tracks, located on the To sub-floor, and fasteners. These tracks are anchored to the. sub-floor via the fasteners.

Thus, with these three subsystems in place, large electrical equipment can be seismically restrained. Importantly, the seismic restraint system of the present invention is easy to install in any on-site layout and can accommodate reconfiguration of the equipment without redrilling of the concrete sub-floor.

Another aspect of the present invention is a seismic anchoring kit which comprises: 1) tracks for mounting on the sub-floor; 2) fasteners for securely holding the tracks in place on the sub-floor; and 3) tie downs. Each tie down comprises: 1) a tethering anchor which is adjustably securable to one of the tracks; 2) a connector for connection directly to a support: assembly; 3) a flexible wire for placement extending between the tethering anchor and the connector; and 4) a tension adjuster for adjusting the tension on the wire. The seismic restraint kit of the present invention is suitable for use with any electrical equipment, and is particularly suitable for use with large computer units weighing up to 2000 pounds or greater with modifications.

In the seismic restraint system and kit, the tension adjuster is preferably a turnbuckle that is adjustable so that each tie down, which includes the components used to connect and tether the computer unit, has about 0 to 6 inches of play. The kit may further comprise an axle for attachment to the connector. The connecter is preferably an angle bracket which is connected to the axle. Additionally, the kit may comprise a rod for attachment to the connector, or a bent plate, to be used with the angle bracket without use of a rod.

The invention further includes method of anchoring a large electrical equipment via its housing where the equipment is located in, or on, a building, where the building has a floor and a sub-floor. This novel method allows for the attachment of the housing with its multiple support assemblies, located on the bottom of the housing, to the sub-floor.

The seismic restraint installation method of the present invention includes the following:
a) attaching at least two tracks to the sub-floor via fasteners;
b) connecting the connector directly to a wheel assembly;
c) attaching the tethering anchors to the track;
d) attaching the flexible wire from the tethering anchor to one end of a tension adjuster;
e) attaching the flexible wire from the other end of the tension adjuster to the wheel connector; and
f) adjusting the tension on the wire via the tension adjuster. This seismic restraint method can be used with any large electrical equipment, and is particularly suited for use with a large computer.

BRIEF DESCRIPTION OF THE DRAWINGS

These and other features, aspects and advantages of the present invention will become better understood from the following description, appended claims, and accompanying drawings where:

FIG. 1 illustrates the relationship between the computer units and the computer room floor.

FIG. 2 shows the components of the seismic restraint system, their relative vertical positions, and the angles formed in relation to each other, to the tile floor system, and to the sub-floor.

FIG. 6 depicts a strut track anchored to a concrete sub-floor by a fastener, a track stiffener and a bolting assembly, which locks the track stiffener to the track.

FIG. 7 also illustrates the relative positions of the components to each other, to the floor and to the sub-floor.

As illustrated in FIG. 8, the computer units in FIG. 8 are restrained as multiple units via a set of fixed support assemblies asset of rotatable support assemblies.

DESCRIPTION

Recent building codes, and in particular, the Uniform Building Code, have outlined minimum design criteria for seismic restraint systems capable of securing large electrical equipment in areas of measurable seismicity. The inventive seismic restraint systems described below meet these criteria in that these systems are capable of restraining electrical equipment, and in particular computer units, during a sizable seismic event. Further, the inventive restraint kits, systems, and methods satisfy the needs presented by on-site installation and reconfiguration of large computer units.

Figure 1:
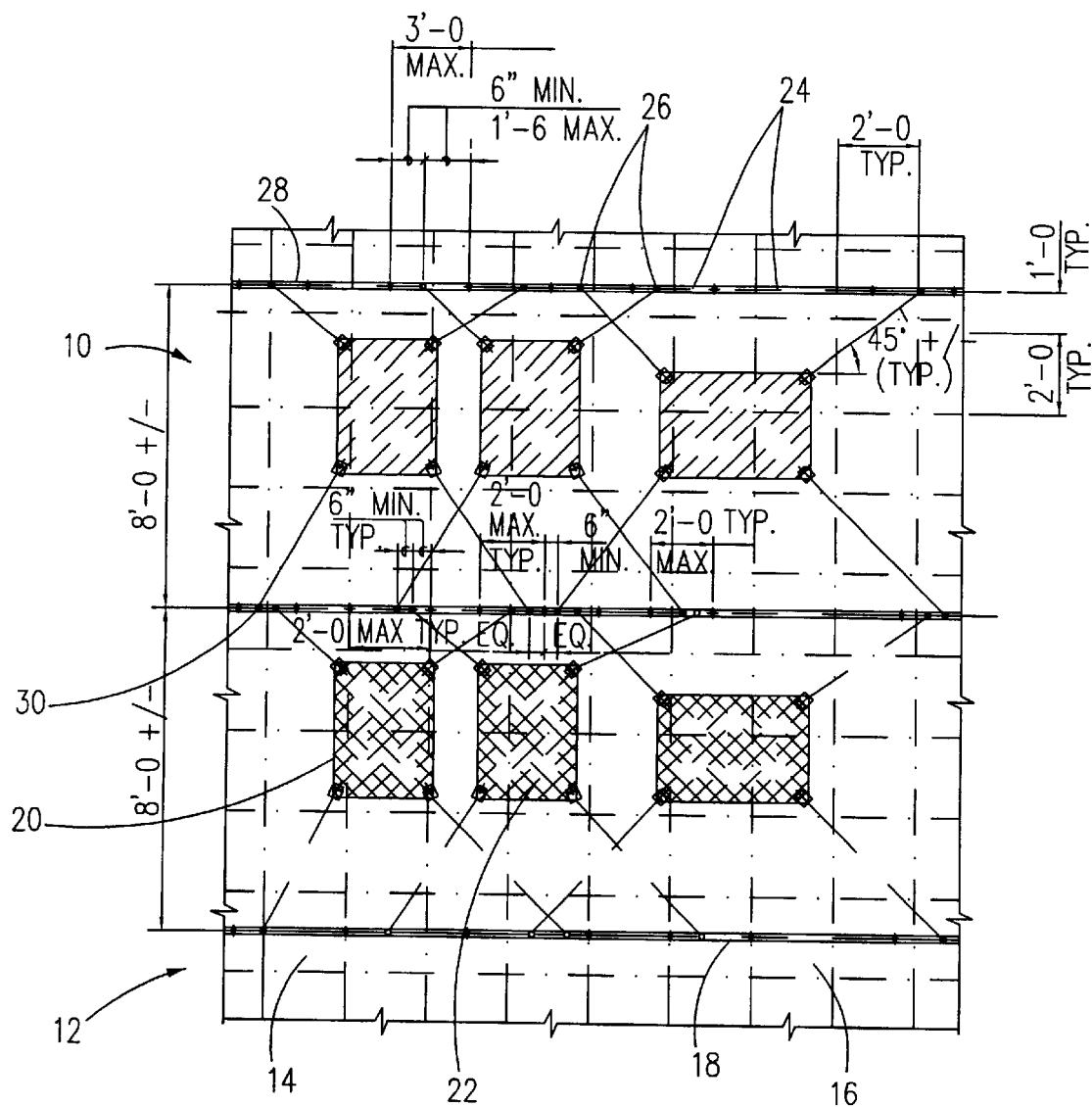
FIG. 1 is a plan view of a computer room having computer units restrained using the seismic restraint system of the present invention.

In the seismic restraint system of the present invention system, the computer units are arranged in plan taking into consideration their relative geometry as illustrated in FIG. 1. Some of the geometric parameters for consideration in setting-up computer units to be seismically restrained are the size and geometry of the individual units, as well as the capacity of the floor system. In the present invention, the maximum weight of each of the computer units typically is about 2000 pounds.

FIG. 1 shows a plan view of a computer unit layout 10 restrained by the seismic restraint system on a floor system 12, comprised of floor tiles 14, located within a building. Beneath the floor system is a sub-floor 16, generally comprised of a concrete slab, steel or a combination thereof, upon which tracks 18 are anchored.

In FIG. 1, the seismic restraint system is shown attached to the housing 20 of the computer units 22 at one end and to tracks 18 on a concrete slab sub-floor 16 at the other end. The concrete slab sub-floor 16 is located below the floor 12 upon which the computer units 22 are placed.

As shown in FIG. 1, the housing 20 of the computer units 22 is generally a rectangular box which houses electronic equipment susceptible to seismic damage. The housing, therefore, generally has six faces, a top face, a bottom face, a front face, a back face and two side faces. Further, the housing is generally supported by at least three support assemblies. FIG. 1 also illustrates the housing 20 of computer units 22 of various sizes and shapes being systematically anchored to the sub-floor 16 via the components of the seismic restraint system.

FIG. 1 further illustrates some of the components of the seismic restraint systems of the present invention. These components include a track 18 affixed to the sub-floor 16 with fasteners 24. Tethering anchors 26 are also shown in FIG. 1. These tethering anchors 26 are used to secure the seismic restraint systems to the track 18.

The fasteners 24 can be any device suitable for affixing the track to concrete, such as anchor bolts, adhesives, shot pins and weldments. The tracks 18 are generally arranged on the sub-floor 16 in parallel, as shown in FIG. 1, aligned with the front and back faces of the housing 20 of the computer units 22. Besides permitting the fasteners 24 to be affixed to the track 18, the tracks further permit the attachment of the tethering anchors 26 directly to the tracks 18, as detailed in FIG. 1 and FIG. 4.

The preferred relative spacing between the fasteners 24 and the tethering anchors 26 is about two tethering anchors between each fastener so as to allow for maximum security during a seismic event. As shown in FIG. 1, the preferred spacing between fasteners 24 is approximately between 1 foot and 3 feet for an exterior track 28, and 6 inches to 2 feet for an interior track 30. The need for a spacing differential between exterior and interior tracks is due to the increased load at the interior tracks, as illustrated in FIG. 1. Preferably, the tracks permit tethering anchors to be placed at any point along the track. Thus, the tracks are preferably strut tracks. These strut tracks 18 are preferably Unistrut or Wesanco tracks, and most preferably, the tracks are P1000 Unistrut continuous type or Wesanco W200 which can be purchased directly from Unistrut or Wesanco.

For computer units weighing 2000 pounds or greater, adjustments are made in the seismic restraint system so that the relative size, strength and spacing of the components are proportional to the increased load. These adjustments include 1) decreasing the spacing between fasteners affixed to the track and 2) increasing the size and capacity of some of the components of the seismic restraint system, such as the rod, the tension adjuster, the cable and the angle bracket.

Figure 2:
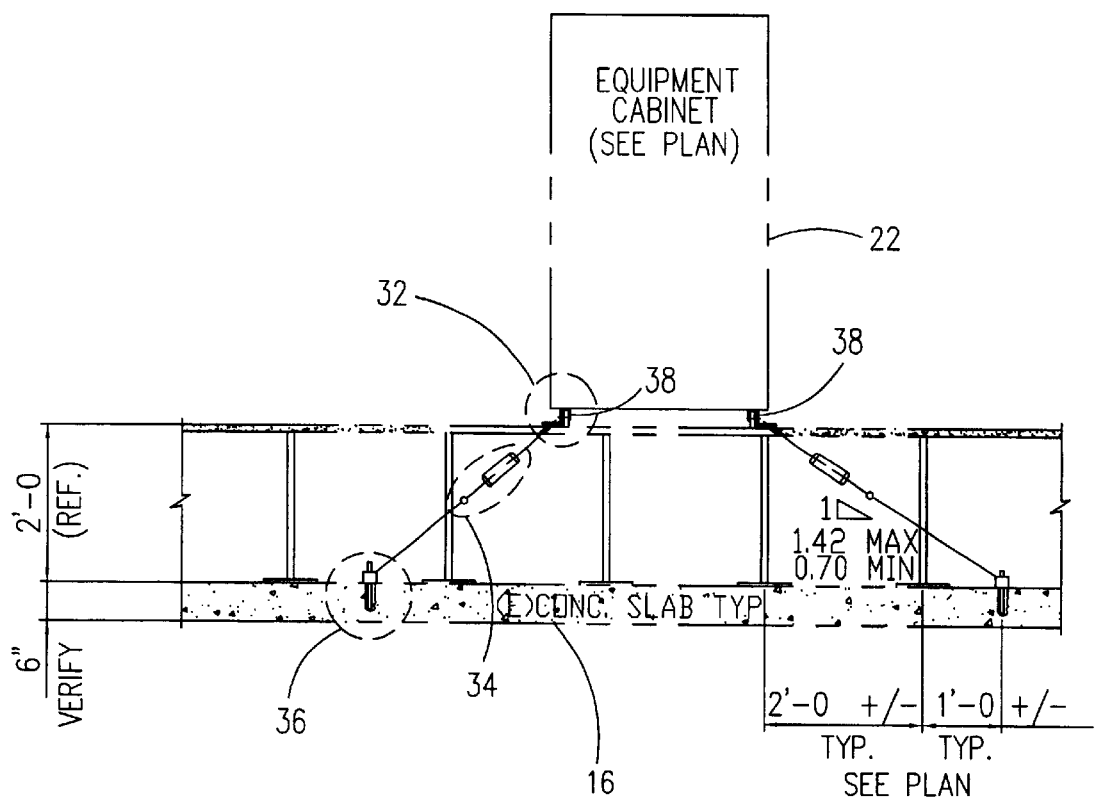
FIG. 2 is a side elevation view of a computer unit on the computer floor secured by the seismic restraint system of the present invention.
Figure 7:
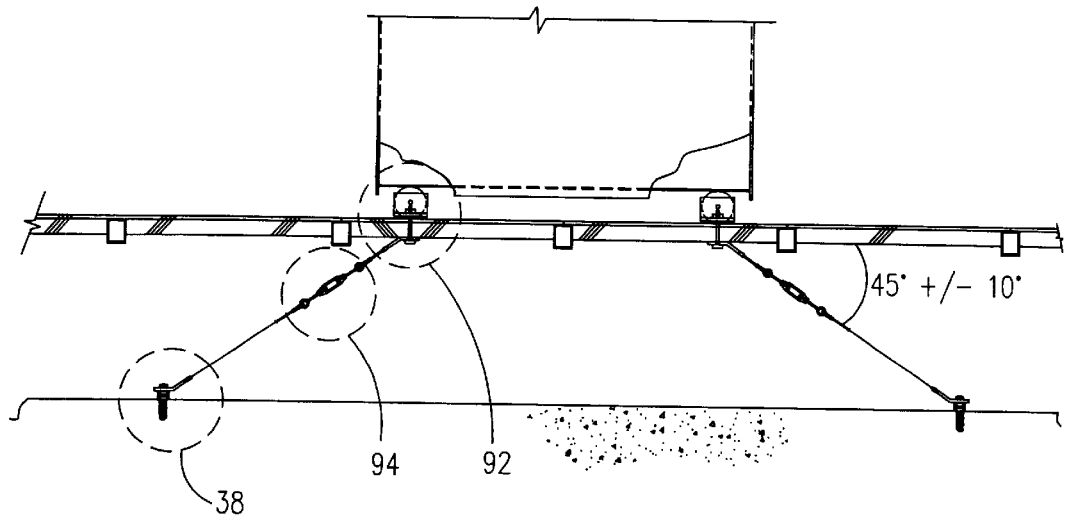
FIG. 7 is a side elevation view of a computer unit on a floor system anchored to a concrete sub-floor by another embodiment of the seismic restraint system.

FIG. 2 shows an elevation view illustrating an embodiment of the seismic restraint system. In FIG. 2, the major components of the seismic restraint system are shown anchoring the computer units 22 to the concrete slab 16. FIG. 7 depicts a similar view for another embodiment of the present invention.

FIG. 2 further illustrates the three major subsystems used to anchor the computer units 22 to the sub-floor 16. These major subsystems are a connector subsystem 32, a tether subsystem 34 and an anchor subsystem 36.

The connector subsystem 32 comprises the components for connecting a computer unit 22 to the seismic restraint system. The components of the connector subsystem 32 generally include an axle and an angle bracket. The axle, however, can be substituted by any device to affix the support assemblies, upon which the computer units 22 are placed, to the angle bracket.

Figure 4:
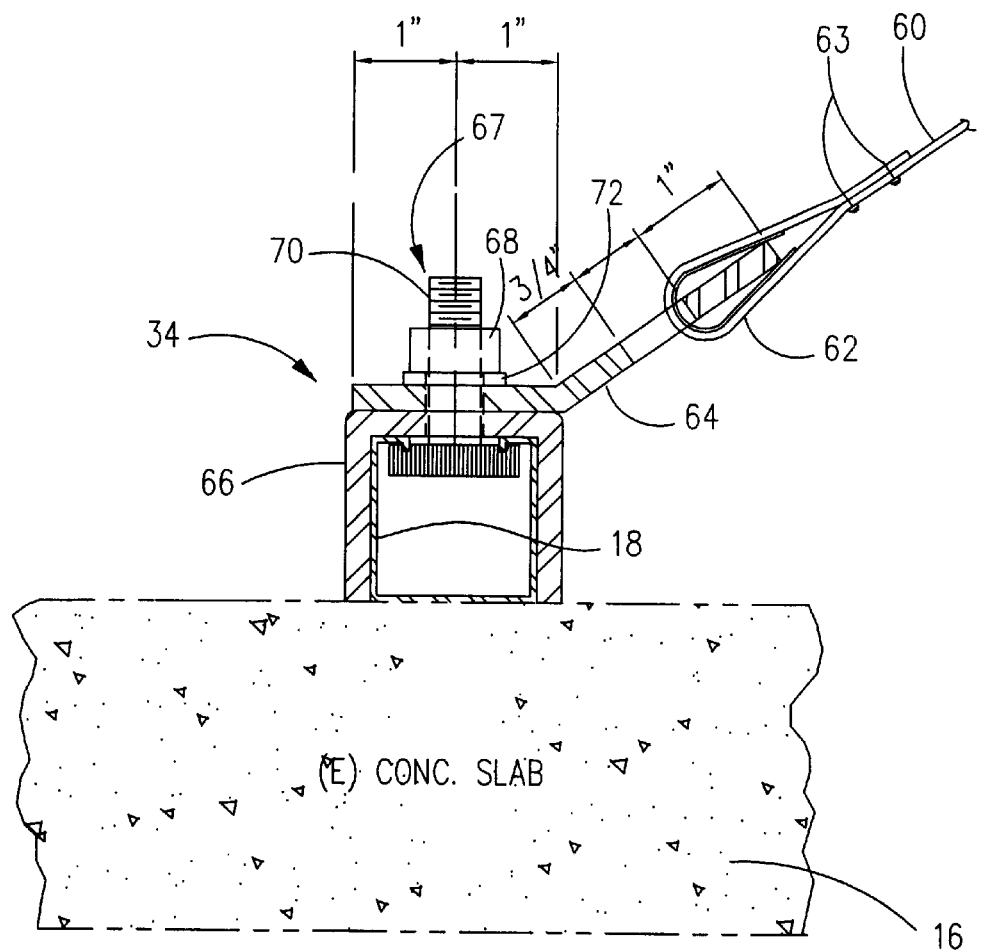
FIG. 4 is a side elevation view of the tether subsystem of the seismic restraint system showing one end of a cable, comprising a thimble attached to a bent plate, and a bolting assembly serving as a point of attachment of the tether subsystem to the track.

The tether subsystem 34 includes components for linking the connector system to the anchor subsystem. The tether subsystem comprises a rod, a tension adjustor, a flexible wire, or a cable or a rod, a bent plate and, a tethering anchor. The tethering anchor comprises a track stiffener affixed with a bolting, or clamping, assembly. The clamping assembly preferably has grooves to lock the stiffeners over the track, as shown in FIG. 4. The flexible wire may further comprise thimbles fixed with clips at, at least, one of its ends.

The anchor subsystem 36 serves as a point of attachment of the seismic restraint system to the sub-floor 16 and to the tether subsystem. The anchor subsystem includes a track, a fastener, a track stiffener and a bolting assembly. The bolting assembly preferably comprises a clamping bolt, a washer, and a nut, and preferably, the clamping bolt has grooves that allow the clamping bolt head to lock into the track.

The seismic restraint system, shown in FIG. 2, is constructed and installed by using the three subsystems of the present invention as further illustrated in FIG. 3, FIG. 4, FIG. 5, and FIG. 6. The components of the seismic restraint system illustrated in FIGS. 3, 4, 5, and 6 are preferably comprised of steel, however, any material comparable to the strength and durability of steel are suitable for use in the present invention.

FIG. 2 further illustrates the arrangement of the three subsystems in relation to one another. FIG. 2 illustrates the relationship of the computer housing 20, with its attached support assemblies 38, to the seismic restraint system. In the invention, the preferred support assemblies are casters with either fixed or rotatable wheels.

Figure 3:
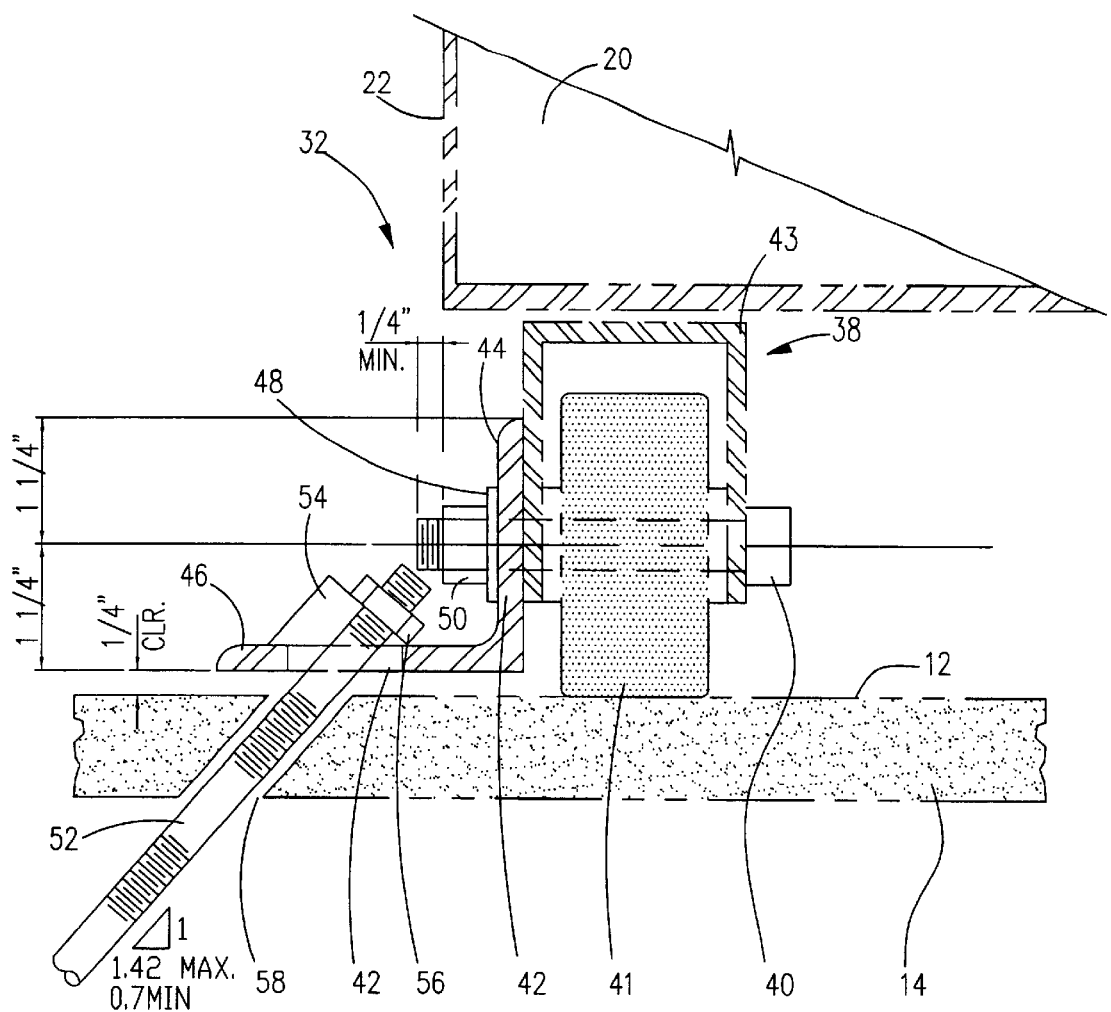
FIG. 3 is a side elevation detail view of the connector subsystem of the seismic restraint system showing the attachment of an angle bracket to a support assembly affixed to the housing of a computer unit. The angle bracket serves to connect the support assembly to the rod, and the rod serves as a linking element, connecting the connector subsystem to the tether subsystem.

FIG. 3 details the connector subsystem 32 which is used to connect to a support assembly 38, comprising a wheel 41 and a frame 43, to the housing 20 of the computer unit 22, located on the floor system 12. The support assemblies in the invention can be any assembly upon which the housing of the computer unit securely rests. In a preferred embodiment the assemblies permit attachment to an angle bracket 42, as shown in FIG. 3.

FIG. 3 further depicts the major components of the connector subsystem comprising the axle 40 and the angle bracket 42. Preferably the angle bracket is a steel angle comprising a shorter vertical leg 44 and a longer horizontal leg 46. As shown in FIG. 3, an axle 40, which can be either the existing axle bolt 45 of the support assembly or a new axle bolt 45, is used to connect the angle bracket 42 to the support assembly 38. This axle 40 is then secured with a washer 48 and nut 50. The angle bracket 42 is then connected to a rod 52, preferably a threaded rod, which comprises the proximal end of the tether subsystem described below. The rod 52 is secured at the angle bracket 42 by a bevel washer 54 and a nut 56. An appropriately sized hole 58 is then drilled in the floor tile 14 for skewed penetration of the rod 52 through the floor tile 14, as shown in FIG. 3.

FIG. 4 depicts some of the major components comprising the distal part of tether subsystem 34, namely the flexible wire 60 comprising a thimble 62 with clips 63 tested to 2000 pounds, a bent plate 64, a track stiffener 66, and a bolting assembly 67, comprising a nut 68, a bolt 70 and a washer 72. The preferred bolting assembly 67 for use in the tether subsystem is a clamping assembly comprising a clamping bolt, nut and washer as shown. As shown in FIG. 4, the track stiffener 66, preferably Unistrut P1376A or Wesanco W-5345, available directly from Unistrut or Wesanco, is placed over the track, already secured to the concrete sub-floor 16, so as to add overall strength to the seismic restraint system. The bent plate 64 is added over the track stiffener 66, and then both the bent plate and the track stiffener are secured to track via the nut 68, a bolt 70 and a washer 72.

Figure 5:
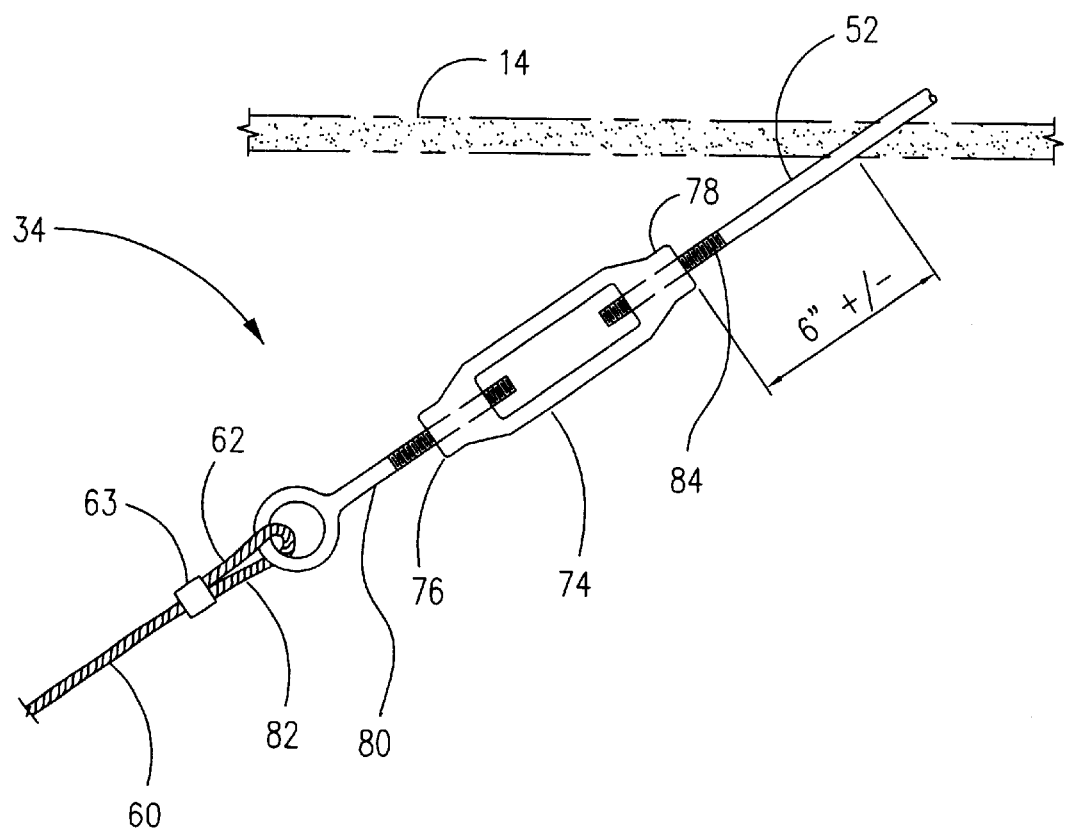
FIG. 5 is a side elevation view of the tether subsystem of the seismic restraint system showing a threaded rod, a turnbuckle, a threaded eyebolt and a cable.

FIG. 5 depicts the proximal end of the tether subsystem 34 comprising a rod 52, a tension adjuster 74, comprising a proximal 76 and distal end 78, an eyebolt 80 and a flexible wire 60, comprising a thimble at its proximal end, as shown, and at its distal end, as shown in FIG. 4. The wire is preferably an extra flex steel wire tested to a minimum of 2000 pounds working load. As shown in FIG. 5, the rod 52, which is shown penetrating a floor tile 14 is preferably attached to the tension adjuster 74 via a threaded end 84. In the invention, the tension adjuster 74 is preferably a turnbuckle, however, other means of adjusting the tension in the system, such as winches and tensors can be utilized in the invention. Also, as shown in FIG. 5, the threaded eyebolt 80 is attached at the distal end of the tension adjuster 74.

Figure 6:
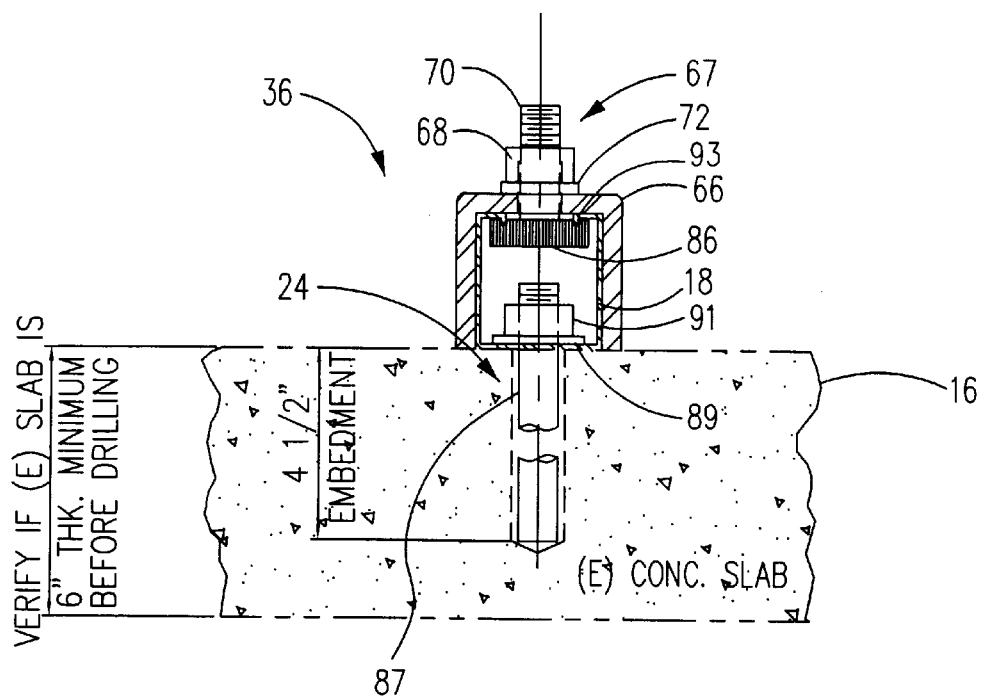
FIG. 6 is a side elevation detail drawing illustrating components of the anchor subsystem of the seismic restraint system.

FIG. 6 shows the major components of the anchor subsystem 36 used to attach the track 18 to the concrete slab sub-floor 16. These components comprise a track 18, preferably a strut track, and a fastener 24 for affixing the track to the sub-floor 16. The fasteners in the invention preferably comprise a bolt 87, a washer 89 and a nut 91. These bolts are to be embedded in concrete from about 3–9 inches, preferably 4½–5½ inches, and most preferably 4–5 inches, given the arrangement shown in FIG. 1. A track stiffener 66 is also placed over the track 18 and secured by bolting assembly 67 comprising a bolt 70 comprising a washer 72 and a nut 68, preferably a clamping nut. The fasteners preferably comprise anchor bolts, and most preferably comprise epoxy anchor bolts with a minimum working strength for tension of 3250 pounds and a minimum strength for shear of 2350 pounds. Preferably, the bolt assembly is a clamping assembly, as shown in FIG. 6 where the clamping bolt head of the nut comprises grooves 93 that lock into the strut track. The fasteners 24 should be spaced from approximately 1 foot to 3 feet for exterior tracks and from approximately 1 foot to 2 feet for interior tracks (see FIG. 1). This spacing differential between the two types of tracks insure that an increased number of tethering anchors can be loaded onto the interior tracks.

To install the connector subsystem in FIG. 3, the footprint of the support assemblies 38 are located on the floor tiles 14 supporting the computer unit. Next, the location of the threaded rod 52 is projected through the floor tile 14. Then, the computer is raised just enough to allow the wheel 41 of the support assemblies 38 to free spin, so to relieve the load off the existing support assembly's axle bolt 45. If the existing axle bolt 45 is not long enough to accommodate the angle bracket 42, a new and longer axle bolt 45 can be used in its place. Next, the angle bracket 42 is attached to the outside of the support assembly 38 and secured with a washer 48 and a nut 50. The washer 48 and the nut 50 are torqued tightly, but not so tightly as to distort the support assembly frame 43. Finally, to link the connector subsystem to the tethering subsystem, the threaded rod 52 is placed through the floor tile 14. The threaded rod is penetrated through the horizontal leg 46 of the angle bracket 42 and secured with the beveled washer 54 and the nut 56.

To install the tether subsystem in FIG. 4, the flexible wire 60, or cable, comprising a thimble 62 is looped through the bent plate 64. Next, the stiffener 66 is placed over the track 18 and is attached by the bolting assembly 67. Then, the bent plate 64 is attached over the stiffener 66 and the strut track 18 using the same bolting assembly 67. This procedure serves to attach the wire 60 to the strut. track 18, which is affixed to the concrete sub-floor 16. The tether anchoring system in FIG. 5 is installed by looping the flexible wire 60 through the eye of the eyebolt 80 and securing the wire with clips 63 so as to provide the required tension in the wire. Next, the rod 52 is threaded from the support assemblies 38 in FIG. 3 to the eyebolt 80 to the strut track 18 through the tension adjuster 74, or turnbuckle in FIG. 5. The turnbuckle can be adjusted by turning to make the wire taut, thus reducing the slack. This procedure serves to secure the computer unit to the tracks.

The anchor subsystem serves to dissipate the energy from the computer unit 22 to the floor 16 in FIG. 2. To install the anchor system in FIG. 6, holes are drilled in the concrete slab sub-floor at predetermined spacings for insertion of concrete drop-in fasteners 24, or anchor bolts. The preferred steel strut track 18 is then anchored to the concrete slab at predetermined interval spacings by the concrete drop-in anchor bolts. At the locations where the fastener 24 is holding down the track 18, a track stiffener 66 is added over the track 18, either directly over the fasteners 24 or offset from the fastener from up to about 2 inches. This procedure serves to anchor the steel strut tracks 18 to the concrete slab, and thus serves to anchor the computer units 22 securely to the concrete sub-floor 16 in FIG. 1.

For on-site situations where using a threaded rod through a floor tile is not possible because of obstructions or inaccessibility, a variation of the seismic restraint system can be utilized, as shown in FIG. 7. Moreover, in situations where fixed support assemblies are affixed to the housing of the computer units, the arrangement shown in FIG. 7 allows for pivoting of the cables attached to fixed support assemblies. This pivoting is permitted by the use of a bent plate below the floor tile.

Figure 9:
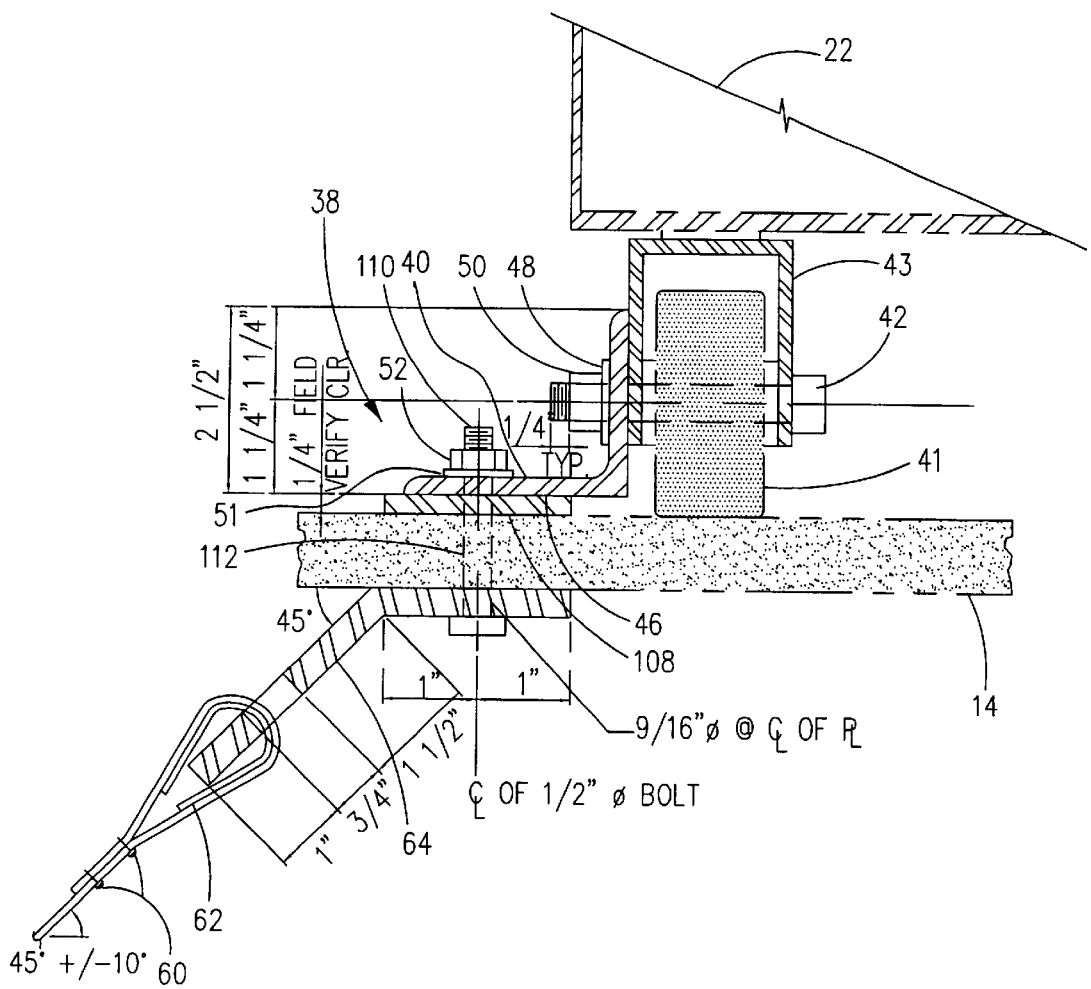
FIG. 9 is a side elevation view of the connector subsystem of the seismic restraint system, as shown in FIG. 7.

FIG. 7 shows an elevation view of the computer units and the three major subsystems used to connect, tether and anchor the units to the sub-floor. Two of these three subsystems are detailed in FIG. 9 and FIG. 10. These subsystems are the connector system 92 and the tether subsystem 94. The anchor subsystem 36 is the same for these two embodiments. The major difference between the embodiment in FIG. 2 and the embodiment in FIG. 7 is in the manner in which the horizontal leg 46 of the angle bracket 42 is attached through the floor tile as shown in FIG. 9. Moreover, the embodiment shown in FIG. 9 is different from the embodiment shown in FIG. 3 in the way the cable 60 is attached to the wheels 41 of the support assemblies 38.

Figure 8:
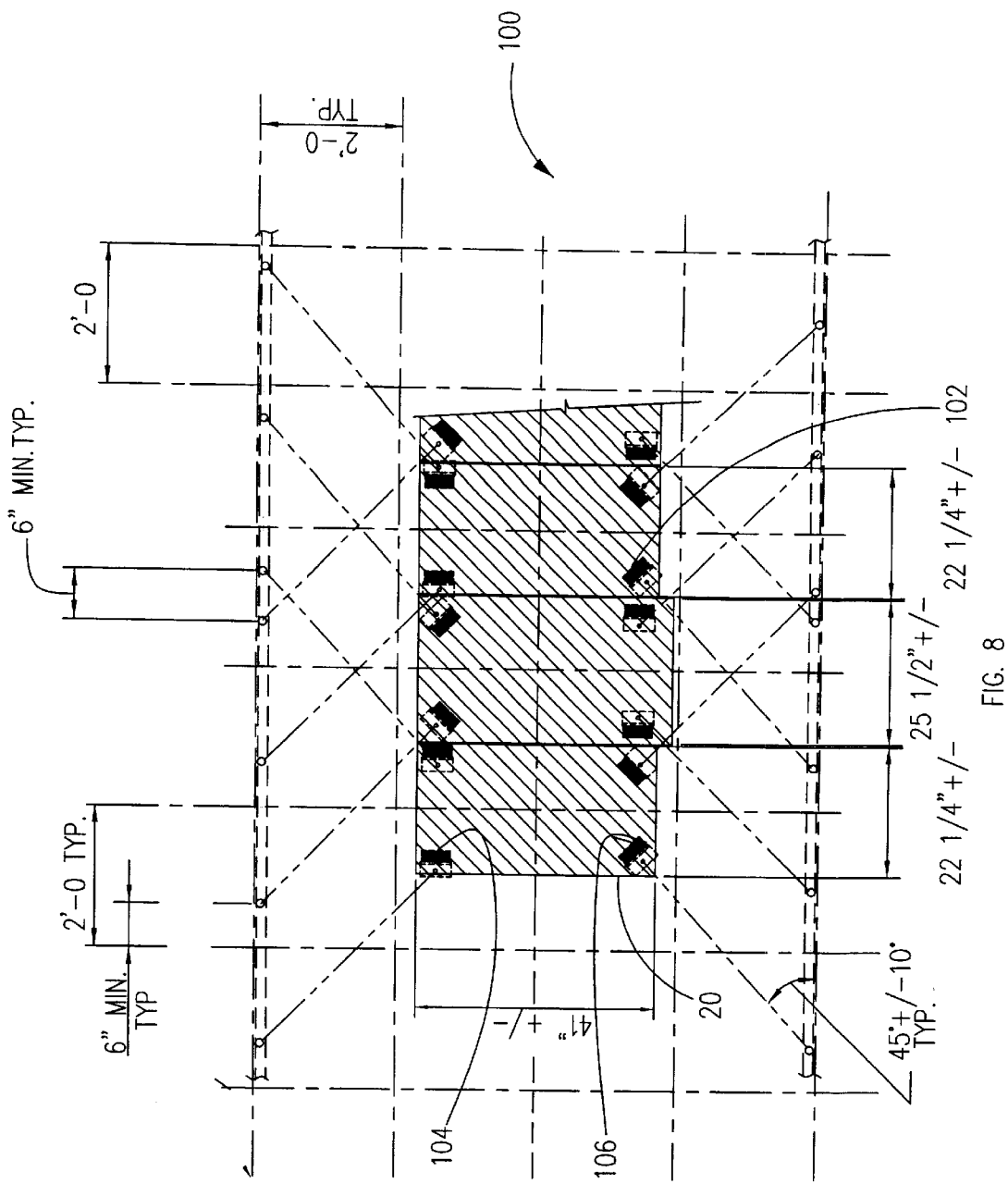
FIG. 8 is a plan view of the embodiment shown in FIG. 7.

FIG. 8 shows a plan view of an alternate computer unit layout 100 restrained with the seismic restraint system of the present invention. The components are the same as those described in FIG. 1, with two differences. One difference is the tethered arrangement of computer units 102 where two or more computer units are tethered together. The other difference is the use of both fixed support assemblies 104 and rotatable support assemblies 106 on the housing 20 of the computer units 22. Overall, however, the three subsystems of the seismic restraining system are similar to those described above for the connector subsystem 32, the tether subsystem 34 and the anchor subsystem 36, shown in FIGS. 3, 4, 5 and 6.

In the connector subsystem depicted in FIG. 8, the horizontal leg 46 of the angle bracket 42 is attached vertically with a bolt 110 through the existing floor tile 14 to a bent plate 64 below the floor tile as shown in FIG. 9. In this embodiment, the bent plate is attached to a cable 60 via a thimble 62, which is attached to an eyebolt and a turnbuckle (both not shown). This arrangement can be compared with the embodiment depicted in FIG. 3, where the horizontal leg 46 of the angle bracket 42 is bolted to a threaded rod 52 that penetrates through the floor tile 14 at a skewed angle. An additional feature of the embodiment is a spacer 108, preferably a shim plate, located under the angle bracket 42 which adds support to the connections.

Figure 10:
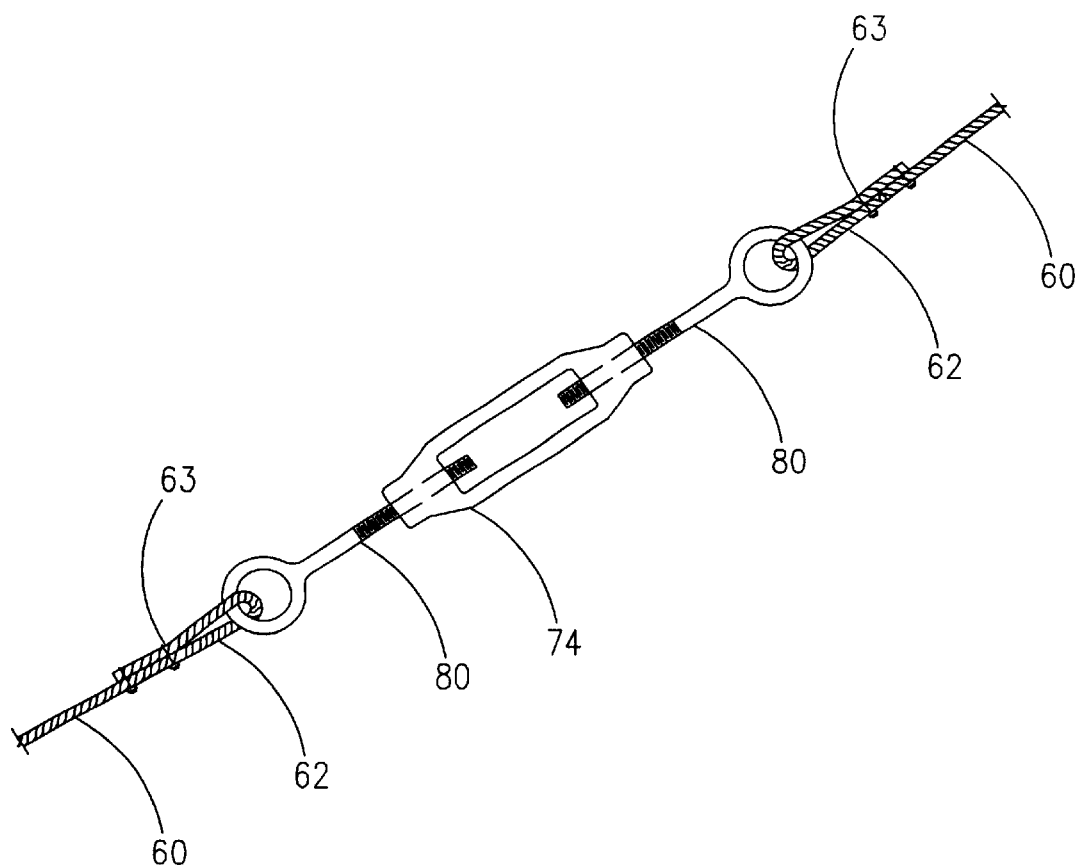
FIG. 10 is an elevation view of the tether subsystem of the embodiment shown in FIG. 7, which shows two cables and two threaded eyebolts connected by a turnbuckle from the support assembly above and from the track below.

As shown in FIG. 10, the turnbuckle 74 is threaded with two eyebolts 80, one from above and one below, as compared with the embodiment shown in FIG. 5 where the turnbuckle 74 is threaded with one eyebolt 80 near the end leading the anchor subsystem. In FIG. 5, the turnbuckle 74 is instead threaded with a threaded rod 52 from above and an eyebolt 80 from below.

Overall, however, the manner in which the cable is attached to the strut tracks and the concrete slab is similar for this alternative embodiment. The seismic restraint system is constructed and installed as illustrated in FIG. 9 and FIG. 10. To install this seismic restraint system for the embodiments shown, the angle bracket can be used as a sizing element serving to size the remaining components in the assembly, e.g., if the size of the angle bracket is increased to compensate for an increased weight load, the size of the remaining components of the system also should be increased correspondingly.

To install the connector subsystems for the embodiment shown in FIG. 7, the footprint of the support assembly 38 is located on the floor tile 14 supporting the computer 22. Then, with the depictions shown in FIG. 7 and FIG. 9, the location of the bolt 110 is projected through the floor tile 14. Next, the penetration of the bolt 110 through the tile 14 is provided by drilling a hole 112. Then the computer is raised just enough to allow the wheel 41 of the support assembly 38 to free spin so as to relieve the load off the existing support assembly axle bolt 45. If the existing axle bolt 45 is not long enough to accommodate the angle bracket 42, a new and longer axle bolt 45 can be used in its place, as described and shown in the embodiment illustrated in FIG. 3. Next the angle bracket 42 is attached to the support assembly frame 43 and secured with a washer 48 and a nut 50. A spacer 108 is then added beneath the angle bracket 42. The washer 51 and nut 50 are secured just tight enough to avoid distorting the support assembly frame 43. Next the bolt 110 is placed through the bent plate 64, through the floor tile 14 and through the angle bracket 42. Thus, the bent plate 64 is attached to the horizontal leg 46 of the angle bracket 42 which is attached to the support assembly 38. The spacer plate 108 keeps the horizontal leg 46 of the angle bracket 42 level when tightening the vertical bolt 110 through the floor tile 14. Next flexible wires 60 and the thimbles 62 are looped through the bent plate 64. Then the end of the wire 60 is then tightened so as to provide the required tension in the wire.

FIG. 10 illustrates another embodiment for the tether subsystem used to connect the cable to the track anchored to the sub-floor. To install this subsystem, two eyebolts 80 are threaded into the turnbuckle 74 and the cables 60 are tightened taut, but not so tight to distort the support assembly frame 43.

From the illustration and descriptions above, it, is apparent that the inventive restraint system comprises the following unique features. The proposed seismic restraint system can be utilized in a complete kit. The computer units can be conveniently and easily attached to cables at support assemblies by using either an existing axle bolt on a caster, for example, a new axle bolt or through bolts where no axle exists and holes have to be drilled into the support assemblies.

Moreover, casters are readily accessible in most mainframe computer units. Further, the inventive system can be utilized with large electrical or electronic equipment that has either rotatable or fixed casters. Moreover, the use of the off-the-shelf angle bracket, as a component to connect the caster to the cable is both efficient and economical.

Further, the cable is secured to a long, continuous strut track by drop-in, anchors. Thus, the continuous track and the internally spaced fasteners allow the cable to be attached to any point on the sub-floor via tethering anchors. Additionally, the cable spacing and anchoring locations may vary according to the individual computer unit geometry and weight, or according to the weight and geometry of a computer cluster. Further, the use of a bent plate below the floor tiles in certain embodiments allow the tethering cables to rotate horizontally and vary vertically to adjust for the variation of the geometry and/or the configurations of the computer units.

Importantly, use of the inventive seismic restraint system allows for much versatility in reconfiguring the computer units. The tether anchor point locations allow the relocation of the seismic restraint system at the sub-floor level without resetting the fasteners, provided that the weight and the initial design limitations are not exceeded. In an environment where continuous operation of the computer units is necessary, the inventive systems allow for modifications of the computer configurations and reconfigurations under the usual operational protocols of such facilities.

Overall, use of the inventive seismic restraint system kit and method provides for simple, low-tech, economical, and speedy installation and reconfiguration protocols of large electrical equipment. Finally, although the invention was described for large computer units affixed with either rotatable or fixed casters, the restraint systems can be utilized with any large electronic or electrical equipment that is affixed to support assemblies.

All features disclosed in the specification, including the claims, abstracts, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means" for performing a specified function or "step" for performing a specified function, should not be interpreted as a "means" or "step" clause as specified in 35 U.S.C. §112.

What is claimed is:

1. A seismic-resistant system for electrical equipment in a building, the building having a floor and a sub-floor, the system comprising:
   a) a housing having a bottom and at least three support assemblies on the bottom, the housing containing electrical equipment that is subject to seismic damage, the housing being on the floor;
   b) at least two tracks affixable to the sub-floor with fasteners;
   c) at least three tie downs, each tie down comprising:
      i) a tethering anchor secured to the track;
      ii) a connector connected directly to a respective one of the support assemblies; and
      iii) a flexible wire extending between the tethering anchor and the connector.

2. The system of claim 1, wherein each said tie down further comprises a tension adjuster for adjusting tension on the wire.

3. The system of claim 1 wherein the bottom of the housing is rectangular and has four support assemblies, one at each corner, and there are four tie downs, one for each wheel assembly, and two parallel tracks with two tie downs secured to each of the tracks.

4. The system of claim 1, wherein the electrical equipment is a computer.

5. The system of claim 1, wherein the support assemblies comprise wheels.

6. The seismic restraint system of claim 5, wherein the wheels comprise an axle.

7. The system of claim 6, wherein the axle is connected to the wheel and wherein the axle is removed and another axle is used for attachment to the connector.

8. The system of claim 6, wherein the axle is connected to the wheel and wherein the axle is removed and another axle is used for attachment to the connector.

9. The system of claim 1, wherein the track is a strut track.

10. A seismic anchoring kit for a housing in a building, the building having a floor and a sub-floor, the housing having a bottom and at least three support assemblies on the bottom, the housing containing electrical equipment that is subject to seismic damage, the kit comprising:
   a) at least two tracks for mounting on the sub-floor;
   b) fasteners for securely holding the tracks in place on the sub-floor; and
   c) at least three tie downs, each tie down comprising:
      i) a tethering anchor adjustably securable to one of the tracks;
      ii) a connector for connection directly to a respective one of the support assemblies;
      iii) a flexible wire for placement extending between the anchor and the connector; and
      vi) a tension adjuster for adjusting the tension on the wire.

11. The kit of claim 10, wherein the bottom of the housing is rectangular and has four support assemblies, one at each corner, and wherein the kit comprises four tie downs adapted for attachment at each support assembly and two parallel tracks adapted for securing two tie downs from the housing to each track.

12. The kit of claim 10, whereby the electrical equipment in the housing is a computer.

13. The kit of claim 10, further comprising an axle for connection to the connector.

14. The kit of claim 10, further comprising a track stiffener and a clamping assembly for securing the tracks, for securing the tethering anchors, or for securing both the tracks and the tethering anchors.

15. The kit of claim 10, wherein the tracks are strut tracks.

16. A method of anchoring a housing in a building, the building having a floor and a sub-floor, the housing having a bottom and at least three support assemblies on the bottom, the housing containing electrical equipment that is subject to seismic damage, the method comprising:
   a) selecting the kit of claim 10; and
   b) installing the kit.

17. The method of claim 16, wherein installing the kit comprises:
   a) affixing the track to the sub-floor via the fasteners;
   b) connecting the connector directly to the wheel assembly;
   c) attaching the tethering anchor to the track;
   d) attaching the flexible wire from the track to the one end of the tension adjuster;
   e) attaching the flexible wire from the other end of the tension adjuster to the connector; and
   f) adjusting the tension on the wire via the tension adjuster.

18. The method of claim 16, wherein the bottom of the housing is rectangular and has four support assemblies, one at each corner, and there are four tie downs, and wherein the method further comprises connecting the support assemblies to the tie downs and attaching two tie downs to each track.

19. The method of claim 16, wherein a computer is provided as the electrical equipment.

20. The method of claim 16, wherein the step of providing a kit comprises selecting a kit such that each support assembly of the kit comprises an axle for attaching to the connector.

\* \* \* \* \*